United States Patent [19]

Schmidt et al.

[11] Patent Number: 4,903,229
[45] Date of Patent: Feb. 20, 1990

[54] FORMS GENERATING AND INFORMATION RETRIEVAL SYSTEM

[75] Inventors: Alfred C. Schmidt, Wilton; Robert T. Durst, Jr., Monroe, both of Conn.

[73] Assignee: Pitney Bowes Inc., Stamford, Conn.

[21] Appl. No.: 25,315

[22] Filed: Mar. 13, 1987

[51] Int. Cl.⁴ ............................................. G06F 7/32
[52] U.S. Cl. .................................. 364/900; 364/943; 364/962; 364/962.2; 364/943.43
[58] Field of Search ............... 364/300, 200 MS File, 364/900 MS File

[56] References Cited

U.S. PATENT DOCUMENTS

| | | | |
|---|---|---|---|
| 4,041,463 | 8/1977 | Slutzky et al. | 364/900 |
| 4,085,445 | 4/1978 | Blevins et al. | 364/900 |
| 4,125,868 | 11/1978 | Hruby et al. | 364/900 |
| 4,314,357 | 2/1982 | Kimura et al. | 364/900 |
| 4,417,322 | 11/1983 | Berry et al. | 364/900 |
| 4,445,795 | 5/1984 | Levine et al. | 400/63 |
| 4,536,857 | 8/1985 | Schoenmakers | 364/900 |
| 4,674,040 | 6/1987 | Barker et al. | 364/300 |
| 4,675,844 | 6/1987 | Yasuda et al. | 364/900 |

Primary Examiner—Gareth D. Shaw
Assistant Examiner—Debra A. Chun
Attorney, Agent, or Firm—Charles G. Parks, Jr.; David E. Pitchenik; Melvin J. Scolnick

[57] ABSTRACT

A forms generating and information retrieval apparatus comprises a compact disc for storing machine readably a plurality of form files and magnetic media for storing machine readably a plurality of information files. A processing means, such as, a computer, communicates with a reader for the compact disc and a reader for the magnetic media such that the processing means directs the compact disc reader to locate a selected one of the form files and transmit the selected forms file to the processing means. The processing means further directs the magnetic media reader to locate a selected one of the information files and transmit the selected information file to the processing means. The processing means merges the selected forms file with the selected information file and transmits the merged files to a printer.

6 Claims, 2 Drawing Sheets

FORMS GENERATING AND INFORMATION RETRIEVAL SYSTEM

BACKGROUND OF THE INVENTION

This invention relates to the generation of forms and the surprinting of information thereon.

It is a common practice for an organization to use preprinted forms for the standardized collection of task specific information for both internal and external distribution. The use of preprinted forms offers the benefit of soliciting and/or depicting only requisite information in a standardized format which facilitates information processing internally by the issuing organization or external receiving organization. For the purpose of expediency, it is customarily for large organizations to maintain a substantial supply of preprinted forms on-hand. Maintaining this supply represents a inefficient utilization of space as well as an associated negative cost factor compounded by the myriad of forms which must be maintained. It is customary for smaller organization, however, to fulfil their form needs by placing frequent orders. The practice of frequent forms ordering has a higher per unit cost associated therewith.

SUMMARY OF THE INVENTION

It is an objective of the present invention to present a means whereby any one of a plurality of forms may be generated on demand.

It is common for large organization and not uncommon for smaller organizations to maintain central information files in machine readable form. Accordingly, it is an further objective of the present invention to present a means by which any one of a plurality of forms may be generated on demand and readily merged with a information file.

It is a still further objective of the present invention to present a means whereby a form may be generated and merged with a general or central information file in such a manner that the information merged with said form file is form specific. That is, a selected field of information is retrieved from the information file according to form specification.

A further objective of the present invention is to present a system whereby a computer is in communication with a machine readable form storage means such as a remote compact disc-ROM (hereafter in the preferred species referred to as compact disc reader) and a source or central information data bank. Deposited on a compact disc in machine readable form is a plurality of form files each file specifying a particular form. Direct communication between the computer and the compact disc is provided through the compact disc reader which permits disc interchangeability. The source information data bank has resident therein a plurality of information files and may be represented by any one of a variety of means such as a magnetic disc. A selected form may be read by the compact disc reader into the computer resulting in the computer calling on the information data bank to transmit to the computer the requisite form information data file fields for merging with the form.

A computer, for example, a personal computer, is keyboard actuated by a requesting party. The requester then enters form and information file identifying codes. The computer is programed to cause the compact disc reader to locate and render to the computer the corresponding form file from the compact disc. The computer is further programed to access the requisite information fields of the information files identified as predicated by the form file from a computer loaded magnetic media, such as a floppy disc or tape. The computer programing then merges the form file with the requisite data fields of the information file per information field identifiers within the form file. Additional information may be merged manually to the form generated or other such information manipulation task may be performed. The computer then direct the merged files to a printing means such as a xerographic generator.

DETAILED DESCRIPTION OF THE PREFERRED EMBODIMENT

Figure 1:
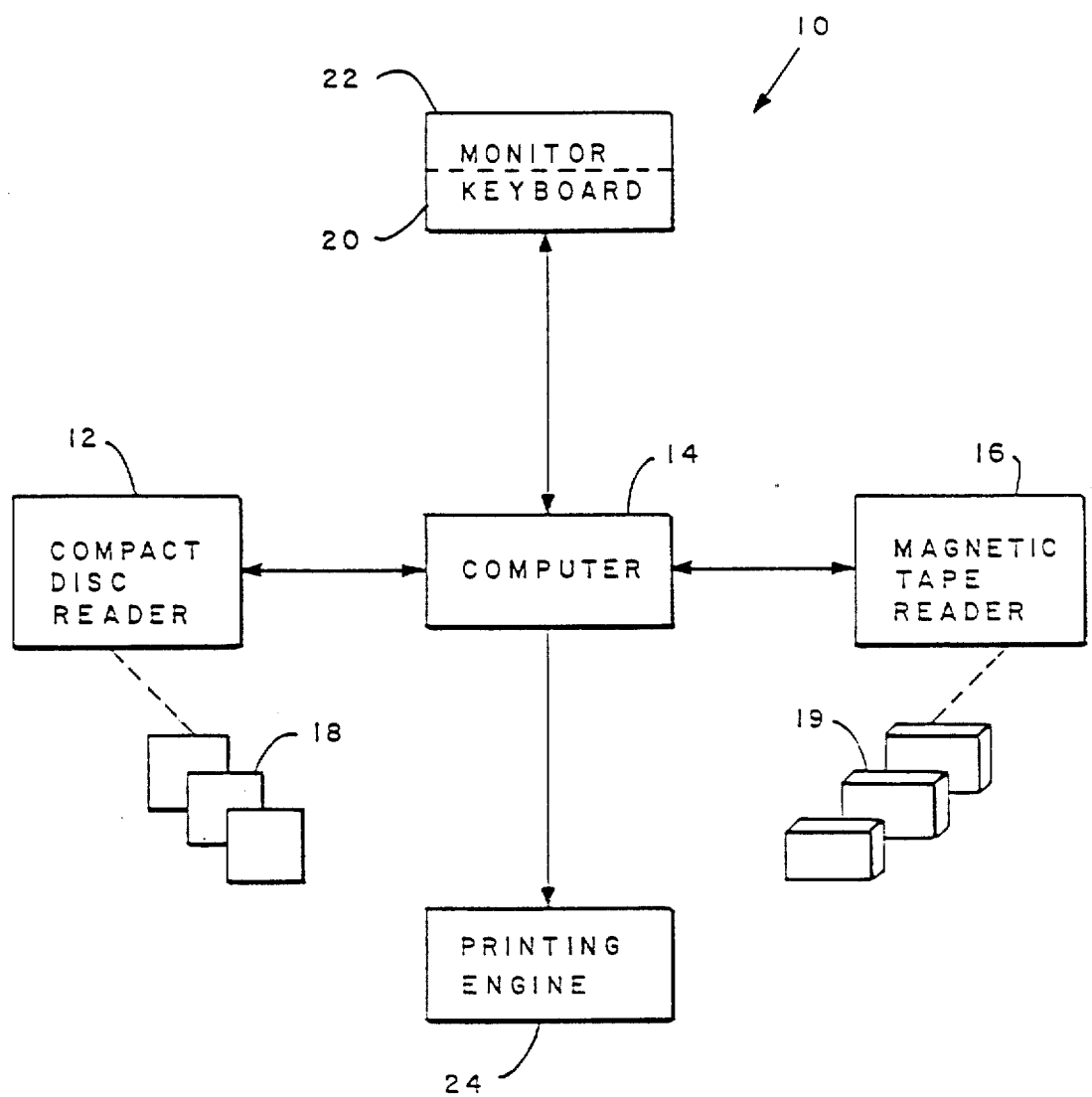
FIG. 1 is a schematic illustration of the forms information retrieval service in accordance with the present invention.

Referring to FIG. 1, preferably the invention is represented in a workstation configuration, generally indicated as 10. The workstation includes a compact disc reader 12 in communication with a personal computer 14. A magnetic disc reader 16 is also in communication with the computer 14. This architecture is with a view to providing the most flexibility to a workstation operator.

The computer 14 includes an operator input communication means such as a keyboard 20 and a output communication means such as a monitor 22. Further in communicating with personal computer 14 is a printing means preferable a xerographic print engine 24 for generating forms including surprinted information. The use of a xerographic print engine 24 inures the benefits of graphic reproduction. A plurality of compact discs 18 are resident at the workstation; each compact disc 18 has deposited thereon in a conventional manner a plurality of form files in machine readable form. It is noted that compact disc offer the advantage of long life, large storage capacity and compactness. In like manner, a plurality of information files are transcribed on magnetic tape 19 in a conventional manner and reside at the workstation. An operator is thereby permitted to select a particular compact disc 18 and load the disc into the compact disc reader 12 and load a requisite magnetic tape 19 into the magnetic tape reader 19.

Figure 2:
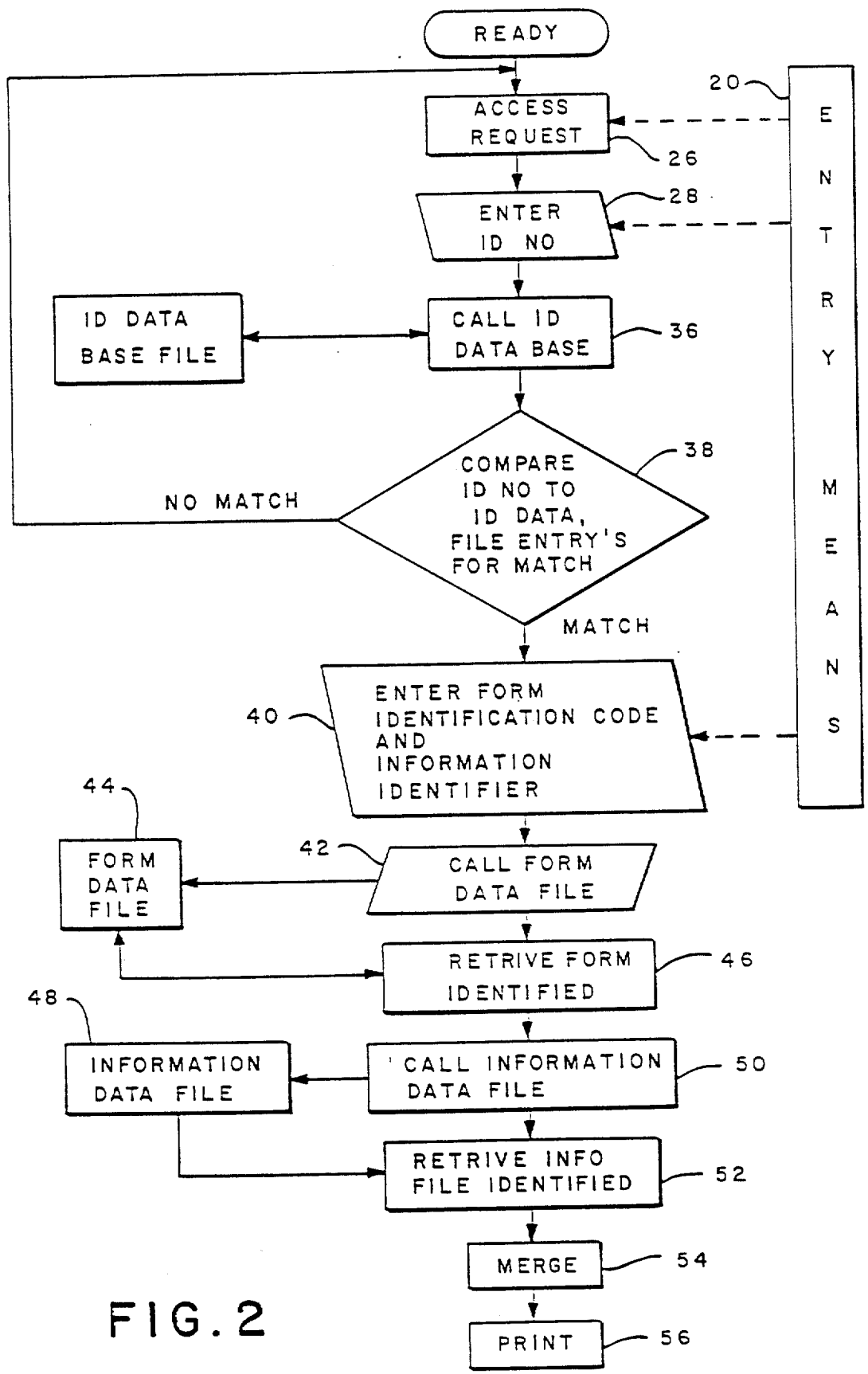
FIG. 2 is a logic diagram for the system in accordance with the present invention.

Referring to the diagram of FIG. 1, the personal computer 14 is programmed in a conventional manner to receive information from the keyboard 20, and to transmit and receive information from the compact disc reader 12, xerographic printer 24 and the magnetic tape reader 16. The computer is also in communication with a video monitor 22. The computer 14 is programmed for interactive response to preform the logistic steps as illustratively shown in FIG. 2.

The program logistics require an operator through the keyboard 20 to enter an access request at 26 and an user identification number (User ID) at 28. The system calls an ID Data file 34 to active memory at 36. The ID Data file 34 is contemplated as residing within a Non-volatile memory resident in the computer 14. Subsequent thereto the User ID is compared to the ID Data File at 38. Should there be no match, operation returns to a ready mode. Should there be a match, operation is directed to request input of a forms identification file code and information identifier file code at 40. The use of user or operator identification number promotes system security.

Subsequent thereto a call forms data file at 42 is executed where upon the loaded compact disc reader 12 is directed to find upon the compact disc 18 that forms file identified by the forms ID code at 44. The form file once located is retrieved to active memory at 46.

In like manner, the information file identified is retrieved. The information data file at 48 is accessible by the call execution at 50 whereupon the loaded magnetic tape reader 16 locates on the loaded magnetic tape the code identified information file. The information data file now located is retrieved and transmitted to active memory at 52. The retrieved forms data file and the retrieved information data file are then merged at 54. The merged file are then printed at 56.

It is within the contemplation of the present invention that the form file retrieved will include information field designation codes. Utilizing conventional programming techniques, only the information file fields designated by the form file will be merged.

In operation, an operator may load any one of a plurality of compact disc 18 into the compact disc reader 12. The compact disc 18 offers the advantage of large storage capacity and small physical size. This enables an operator to have ready access to an inordinate number of form files which consuming minimal storage space. Further, it is noted that the cost of reproducing a compact disc for distribution is relatively small facilitating general distribution. The operator must also load into the magnetic tape reader 16 of a magnetic tape 19 which contains a plurality of information files. Further, it is noted that the information file may be resident in a remotely located source information data base in on-line access to the information data base. On-line access to the information data base provides the operator access to the most current information files.

The use of an operator ID promotes system security, in that, access is limited to authorized personal. It is further noted that information file access may be limited to authorized operator ID's. The system allows an operator to enter a form identification code and a information identifier code. The compact disc reader 12 is directed to optically scan the loaded compact disc 18 for the corresponding forms data file. Once the fomrs data file is located, the compact disc reader 12 transmits the file information to active computer memory. In like manner, the computer directs the magnetic tape reader 16 to locate and transmit to active memory the corresponding information file. It is noted that the forms file may include information field designation which allows selective merging of the information fields to the forms fields. Therefore, allowing a central information file to merge with a variety of task specific form files.

Subsequent to file merging, an operator may surprint addition information to the merged file through keyboard operation. On operator command, the system then direct printing of the merged and surprinted file to a printing means. Note that the printed document may have printed thereon machine readable identifying markings such as bar code. One use for such markings may be used for preliminary sorting by the document recipient. In the preferred embodiment of the present invention a xerographic print engine 24 offers the ability to generate forms including color graphic depictions. It is noted that the computer 14 may be programed to cause the printed document to have printed thereon machine readable identifying markings, such as, a bar code, etc. The machine readable markings may be used to allow the forms recipient to scan the machine readable markings for initial sorting.

It is here noted that the afore described represents a preferred embodiment of the present invention and should not be view as limiting. The full scope of the present invention is defined by the subsequent claims.

What is claimed is:

1. A forms generating and information retrieval apparatus, comprising:

first means for storing a large number of independent, machine-readable form files, said first means including a compact disc reader and a compact disc detachably mounted in said compact disc reader and having written thereon in machine-readable form all of said large number of form files, each of said form files having associated therewith a unique identification code and having a plurality of information field identifiers;

second means for storing a plurality of machine-readable information files, said second means including a magnetic media reader and a magnetic media mounted in said magnetic media reader and having written thereon in machine-readable form a plurality of information files each divided up into a plurality of fields each with its own identifier, each of said information files having associated therewith a unique identification code;

processing means;

access means for allowing an operator to communicate with said processing means, said access mean being utilized to allow said operator to selectively identify one of said form files and one of said information files by communicating to said processing means said respective identification codes and to selectively identify field identifiers of said selected form files;

said processing means being in communication with said first means and said second means, said processing means being responsive to said operator selection of identification codes and field identifiers such that said processing means can direct said first means to locate a selected one of said form files corresponding to the respective identification code and transmit said selected forms file to said processing means for storing therein, and can direct said second means to locate a selected one of said information files corresponding to the respective identification code and transmit said selected information file to said processing means for storing therein, said processing means being active to merge said selected stored forms file with said selected stored information file fields as specified by said selected field identifiers; and means in communication with said processing means for printing said merged files.

2. Apparatus as claimed in claim 1, wherein said information file contains information in a plurality of fields exceeding the number of field identifiers in some of said form files, whereby only some of the information in the information file is merged with said form files.

3. A forms generating and information retrieval apparatus as claimed in claim 1, wherein said processing means further includes means for causing said merged files to include an identification code field, which field shall be printed by said printing means in machine-readable form.

4. A forms generating and information retrieval apparatus as claimed in claim 1, wherein said processing means has an active memory, and the selected forms file and selected information file are stored in said active memory.

5. A forms generating and information retrieval apparatus as claimed in claim 1, further wherein said printing means is a xerographic printer.

6. A forms generating and information retrieval apparatus as claimed in claim 1, wherein said access means further includes security means for requiring said operator to communicate to said processing means identifying means recognizable by said access means.

* * * * *